(12) United States Patent
Kirkpatrick

(10) Patent No.: US 8,571,499 B1
(45) Date of Patent: Oct. 29, 2013

(54) WIRELESS TERRESTRIAL COMMUNICATIONS SYSTEMS USING A LINE-OF-SIGHT FREQUENCY FOR INBOUND DATA AND A NON-LINE-OF-SIGHT FREQUENCY FOR OUTBOUND DATA

(75) Inventor: Harold Kirkpatrick, Stuart, FL (US)

(73) Assignee: Harold Kirkpatrick, Stuart, FL (US)

( * ) Notice: Subject to any disclaimer, the term of this patent is extended or adjusted under 35 U.S.C. 154(b) by 357 days.

(21) Appl. No.: 12/902,482

(22) Filed: Oct. 12, 2010

(51) Int. Cl.
H04B 1/04 (2006.01)

(52) U.S. Cl.
USPC .......... 455/127.4; 455/7; 455/13.1; 455/3.05; 725/64

(58) Field of Classification Search
USPC ........ 455/7, 13.1, 12.1, 427, 3.02, 3.06, 3.01, 455/73, 414.1, 414.3, 63.4, 66.1, 67.15, 455/552.1, 556.1, 557, 562.1, 575.7; 370/316, 319, 326, 325, 395.1
See application file for complete search history.

(56) References Cited

U.S. PATENT DOCUMENTS

| | | | | |
|---|---|---|---|---|
| 5,483,663 A | * | 1/1996 | Tawil | 725/68 |
| 5,835,057 A | * | 11/1998 | van Heyningen | 342/359 |
| 6,137,996 A | * | 10/2000 | Baumann | 455/82 |
| 6,549,788 B1 | * | 4/2003 | Karabinis et al. | 455/575.7 |
| 7,174,127 B2 | | 2/2007 | Otten et al. | |
| 7,286,795 B2 | | 10/2007 | Ducasse | |
| 7,606,590 B2 | * | 10/2009 | Karabinis | 455/522 |
| 7,728,766 B2 | * | 6/2010 | Draganov et al. | 342/354 |
| 2002/0160708 A1 | * | 10/2002 | Hane et al. | 455/3.06 |
| 2003/0022625 A1 | * | 1/2003 | Otten et al. | 455/13.1 |
| 2005/0030915 A1 | * | 2/2005 | Golombek et al. | 370/316 |
| 2005/0239404 A1 | * | 10/2005 | Karabinis | 455/12.1 |
| 2006/0040657 A1 | * | 2/2006 | Karabinis et al. | 455/427 |
| 2006/0270470 A1 | * | 11/2006 | de La Chapelle et al. | 455/575.5 |
| 2007/0072545 A1 | * | 3/2007 | Karabinis et al. | 455/12.1 |
| 2007/0129019 A1 | * | 6/2007 | Otten et al. | 455/73 |
| 2007/0192805 A1 | * | 8/2007 | Dutta et al. | 725/64 |
| 2008/0161512 A1 | * | 7/2008 | Kawano et al. | 526/123.1 |
| 2010/0015971 A1 | * | 1/2010 | Good et al. | 455/427 |
| 2010/0115123 A1 | * | 5/2010 | Airamo | 709/234 |
| 2010/0180291 A1 | * | 7/2010 | Kahn et al. | 725/31 |
| 2011/0123028 A1 | * | 5/2011 | Karabinis | 380/270 |
| 2011/0188597 A1 | * | 8/2011 | Agee et al. | 375/267 |
| 2011/0271306 A1 | * | 11/2011 | Kahn et al. | 725/68 |

* cited by examiner

*Primary Examiner* — Tan Trinh

(74) *Attorney, Agent, or Firm* — Smith, Gambrell & Russell, LLP

(57) ABSTRACT

A terrestrial communications system which comprises one or more terrestrial transmitting nodes for transmitting a first set of signals, one or more terrestrial receiving nodes for receiving a second set of signals, and a plurality of user units, each of the user units including a transceiver for transmitting the second set of signals to the terrestrial receiving nodes and for concurrently receiving the first set of signals from the respective terrestrial transmitting node, wherein the first set of signals are in a first frequency band between 11.0 GHz-13.0 GHz and wherein said second set of signals are in a second frequency band between 0.7 GHz-3.0 GHz.

20 Claims, 5 Drawing Sheets

WIRELESS TERRESTRIAL COMMUNICATIONS SYSTEMS USING A LINE-OF-SIGHT FREQUENCY FOR INBOUND DATA AND A NON-LINE-OF-SIGHT FREQUENCY FOR OUTBOUND DATA

FIELD OF THE INVENTION

The present teachings relate to a wireless terrestrial communications system. In particular, the present teachings relate to a wireless terrestrial communications system which uses a line-of-sight frequency for transmission of inbound data and a non-line-of-sight frequency for transmission of outbound data.

BACKGROUND OF THE INVENTION

During the past two decades, the world has experienced remarkable changes in the telecommunication industry. Communications that were previously carried on the wires are now supplied over radio (wireless). For example, wireless mobile services grew from 11 million subscribers worldwide in 1990 to more than 2 billion in 2005. During the same period, the Internet grew from being a curious tool for academicians and researchers to a virtually mandatory tool for millions of people all around the world desiring to participate in the global community. This staggering growth of the Internet is driving demand for higher-speed Internet-access services, leading to a parallel growth in broadband adoption. In less than a decade, broadband subscription worldwide has grown from virtually zero to over 200 million. The desire to combine the convenience of wireless with the rich performance of broadband has been one of prime driving forces of wireless communication industry.

Digital subscriber line (DSL) technology, which delivers broadband over twisted-pair telephone wires, and cable modem technology, which delivers over coaxial cable TV plant, are the leading mass-market broadband access technologies today. Both of these technologies typically provide up to a few megabits per second of data to each user, while with the newer fiber to the home systems several tens of megabits per second are possible. As Internet applications continue to require more bandwidth, users are demanding ever faster Internet service from the service providers. Fiber to the home systems that can meet the user requirement are, however, extremely costly to deploy, have a long deployment time, and, due to the cost, will generally be exclusive to highly urbanized area. Thus, providing even greater impetus to wireless communication industry to offer users a cheaper, faster, and ubiquitous wireless broadband service.

One of the leaders in the wireless communication industry that are trying to meet the market demand for wireless broadband service are Mobile operators. Mobile operators around the world are upgrading their networks to 3G technology to deliver broadband applications to their subscribers. Mobile operators using GSM (global system for mobile communications) are deploying UMTS (universal mobile telephone system) and HSDPA (high speed downlink packet access) technologies as part of their 3G evolution. Traditional CDMA operators are deploying 1×EV-DO (1x evolution data optimized) as their 3G solution for broadband data. Actual user data rates for these technologies are generally considerably lower than the wired broadband services. For example, using 5 and 10 codes, HSDPA supports peak data rates of 3.6 Mbps and 7.2 Mbps, respectively. However, typical average rates that users obtain are in the range of 250 kbps to 750 kbps. Enhancements, such as spatial processing, and multiuser detection, can provide higher performance over basic HSDPA systems, albeit at a higher cost of deployment. Further, the cell radius of 3G solutions is generally limited to between 1 to 3 miles, which, by virtue of deployment cost, results in limiting the operation of these types of networks to highly urbanized areas.

One of the fundamental challenges for broadband wireless comes from the transmission medium itself. The designs of most current broadband wireless services are such that signals have to travel under challenging Non-Line of Site (NLOS) conditions. Large and small obstructions, terrain undulations, and interference from other signals, together weaken, delay, and distort the transmitted signal in an unpredictable and time-varying fashion. Design of a digital communication system that performs well under these conditions, especially when the service requirements call for very high data rates, is particularly challenging. 3G solutions as well as other NLOS systems all are subject to the limitation imposed by NLOS transmission medium.

Another challenge to broadband wireless comes from the scarcity of radio-spectrum resources. Regulatory bodies around the world have allocated only a limited amount of spectrum for commercial use. The need to accommodate an ever-increasing number of users and offering bandwidth-rich applications using a limited spectrum challenges the system designer to continuously search for solutions that use the spectrum more efficiently. In order to achieve higher system-wide spectral efficiency the concept of a cellular architecture are used. Typically, a small group of cells or sectors form a cluster, and the available frequency spectrum is divided among the cells or sectors in a cluster. The pattern of frequency allocation within a cluster is then repeated throughout the desired service area and is termed frequency reuse. Naturally, reuse of frequency results in increased inference within the same system, which consequently leads to degradation in the data rate transfer. This is particularly true for the systems operating in the NLOS frequencies where the terrain undulation and other structures are not very effective in reducing interfering signals strength.

A wireless broad system designed for accessing the Internet generally requires much higher downlink capacity than uplink capacity. For example, in Web browsing, a predominate Internet application, the uplink data basically contains the URL of the Web site of interest, but the downlink contains the entire content the Web page, which generally includes considerable amount of data intensive graphics and text, among other things. Other applications may have more symmetrical uplink/down characteristics but the average behavior of the link is usually highly asymmetrical. As a result, the selected method of duplexing for the broadband wireless system must be appropriated so as to reflect the asymmetrical nature of Internet data. In frequency division duplexing (FDD), this can be accomplished by allocation of more bandwidth for downlink than uplink, while in time division duplexing (TDD) allocation of greater number of time slots for downlink verses uplink achieves the desired result.

TDD is highly sensitive to timing and thus not particularly well suited for systems with large cell radiuses. The frequency band allocations for FDD 3G solutions are usually paired so as have similar propagation characteristic. While this feature may prove to be useful for link optimization and employment of single antenna for both transmission and reception, it does not, however, allow for frequency band selection that is advantageously suited to the asymmetrical nature of the Internet data traffic pattern.

To overcome the deficiencies of the present wireless broadband systems U.S. Pat. No. 7,174,127 to Otten discloses a hybrid satellite communications system that includes a satellite system and a terrestrial communications system. As shown in FIG. 1, the satellite system includes two transceivers. The first transceiver receives and transmits a first set of signals received from the terrestrial communications system to a plurality of user units. In reverse fashion, the satellite systems second transceiver receives a second set of signals in a second frequency band from the user units and transmits those signals back to the terrestrial communications system. The first set of signals (downlink signals) are of much higher frequency than the second set of signals (uplink signals) and are relayed by a Direct Broadcast System (DBS) satellite in a LOS frequency band between 12.2 GHz and 12.9 GHz, while the second set of signals are relayed by a Mobile Satellite System (MSS) satellite operating in a frequency between 1.0 GHz and 3.0 GHz, or relayed by a terrestrial node operating between 0.8 and 2.0 GHz.

The use of a 500 MHz band for transmission of downlink signal at first appears to be a significant improvement over the prior art, which are generally limited to tens of MHz. However, this band must be shared with all the potential subscribers that lie in the satellite footprint, which in this includes the entire North America. In addition, this band is also being used for DBS primary service of broadcast television. Thus, the user bandwidth allocation does not appear to have been significantly increased by this method. Even the use of spot beams does not necessarily improve the situation, since the footprint of even a spot beam may include several major metropolitan areas. Further, the significant round trip propagation delay associated with satellites and a terrestrial system can detrimentally influence the user experience for various Internet applications Accordingly, there is a need for a high speed, low deployment cost, wireless broadband system which provides access to Internet users. It would also be desirable for this system to provide service to urban, suburban, and rural areas and at the same time have low propagation delay.

Moreover, it would be particularly desirable to provide a terrestrial wireless broadband system where the downlink signals are of much higher frequency than the uplink signals and are operating in a LOS frequency band.

SUMMARY OF THE INVENTION

The present teachings disclose a system of terrestrial communications that provides wireless broadband service for Internet users. The system includes one or more terrestrial transmitting nodes for transmitting a first set of signals and one or more terrestrial receiving nodes for receiving a second set of signals. The system further includes a plurality of user units, each of which includes a transceiver for transmitting the second set of signals to the terrestrial receiving nodes and for concurrently receiving the first set of signals from the corresponding terrestrial transmitting node. The first set of signals are in a first frequency band between 11.0 GHz-13.0 GHz, while the second set of signals are in a second frequency band between 0.7 GHz-3.0 GHz. Preferably, the first frequency band is a satellite shared band and more preferably it is the DBS band.

The system further includes a terrestrial communications means for transmitting the first set of signals to the terrestrial transmitting nodes and for receiving the second set of signals from the terrestrial receiving nodes. Generally, the user units include personal computers and the terrestrial communication means is connected to the Internet. This configuration allows the personal computers access to the Internet through the terrestrial communications means, the terrestrial transmitting nodes, and terrestrial receiving nodes.

A user unit that provide Internet access generally includes a wireless receiver that is configured to receive inbound data from an Internet service provider via a first terrestrial link, and a wireless transmitter that is configured to wirelessly transmit outbound data to the Internet service provider via a second terrestrial wireless link. Generally, the frequency band of the first terrestrial link is in a first frequency band between 11.0 GHz-13.0 GHz while the frequency band of the second terrestrial link is in a second frequency band between 0.7 GHz-3.0 GHz. In one embodiment, the first and second terrestrial links run a Wi-Max protocol. While in another embodiment each of the first and second terrestrial links can operate on TDMA, CDMA, SDMA or OFDMA.

In one embodiment, a terrestrial communications system includes one or more terrestrial base stations for transmitting a first set of signals and receiving a second set of signals, and a plurality of user units, each of the user units including a transceiver for transmitting the second set of signals to the base station and for concurrently receiving the first set of signals from the base station. The first set of signals are in a first frequency band between 11.0 GHz-13.0 GHz and wherein said second set of signals are in a second frequency band between 0.7 GHz-3.0 GHz. The first frequency band generally is the DBS band.

The terrestrial base station further includes a transmit antenna for radiating the first set of signals. Preferably, this transmit antenna has a maximum gain and a vertical beam pattern that are designed to minimize the interference to DBS receivers. The vertical beam pattern of the transmit antenna preferably includes a beamwidth that is about 5 degrees or less and a sidelobe envelope towards ground that is about 15 dB or more below the maximum gain. In one embodiment, the transmit antenna is sectorized.

Additional features and advantages of various embodiments will be set forth, in part, in the description that follows, and, in part, will be apparent from the description, or may be learned by practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DESCRIPTION OF THE INVENTION

The present teachings are directed to a wireless broadband system which is particularly adapted to providing Internet, television and video service to a user. Present teaching provides a wireless broadband system where the frequency band of a downlink signal is substantially different from the frequency band of an uplink signal. The downlink signal is designed to operate in a frequency where it is possible to have a large frequency bandwidth, so as facilitate high throughput for downlink data transfer, and as a result provide for a better match between the system capacity for downlink data transfer and the asymmetrical downlink Internet traffic demand. Present teaching also provides for reuse of frequency band allocated for uplink and downlink signals in a terrestrial cellular network topology that can significantly increase bandwidth allocation per user over the prior art.

Figure 1:
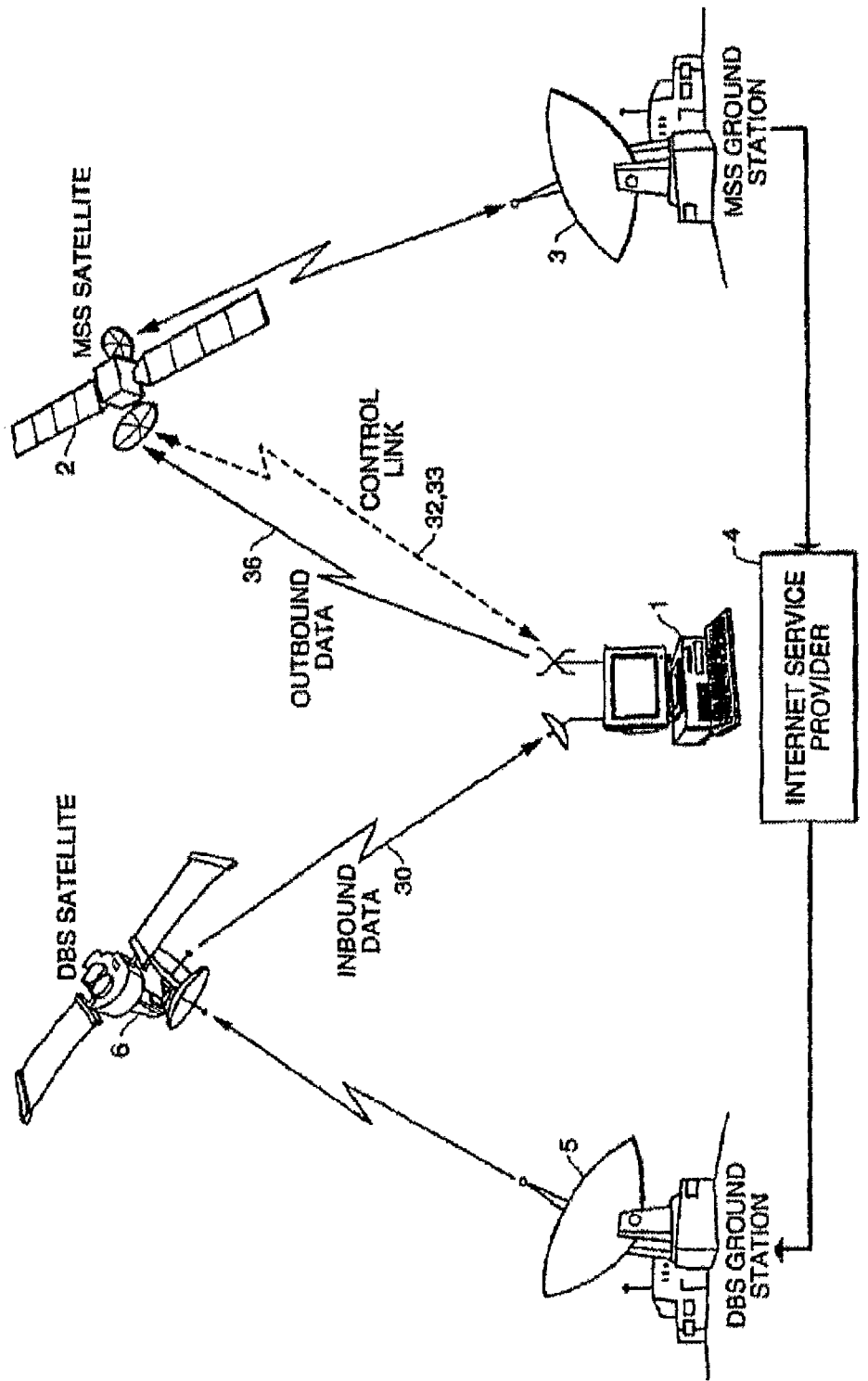
FIG. 1 is a prior art diagram showing an overview of elements of a hybrid satellite communication system.
Figure 2:
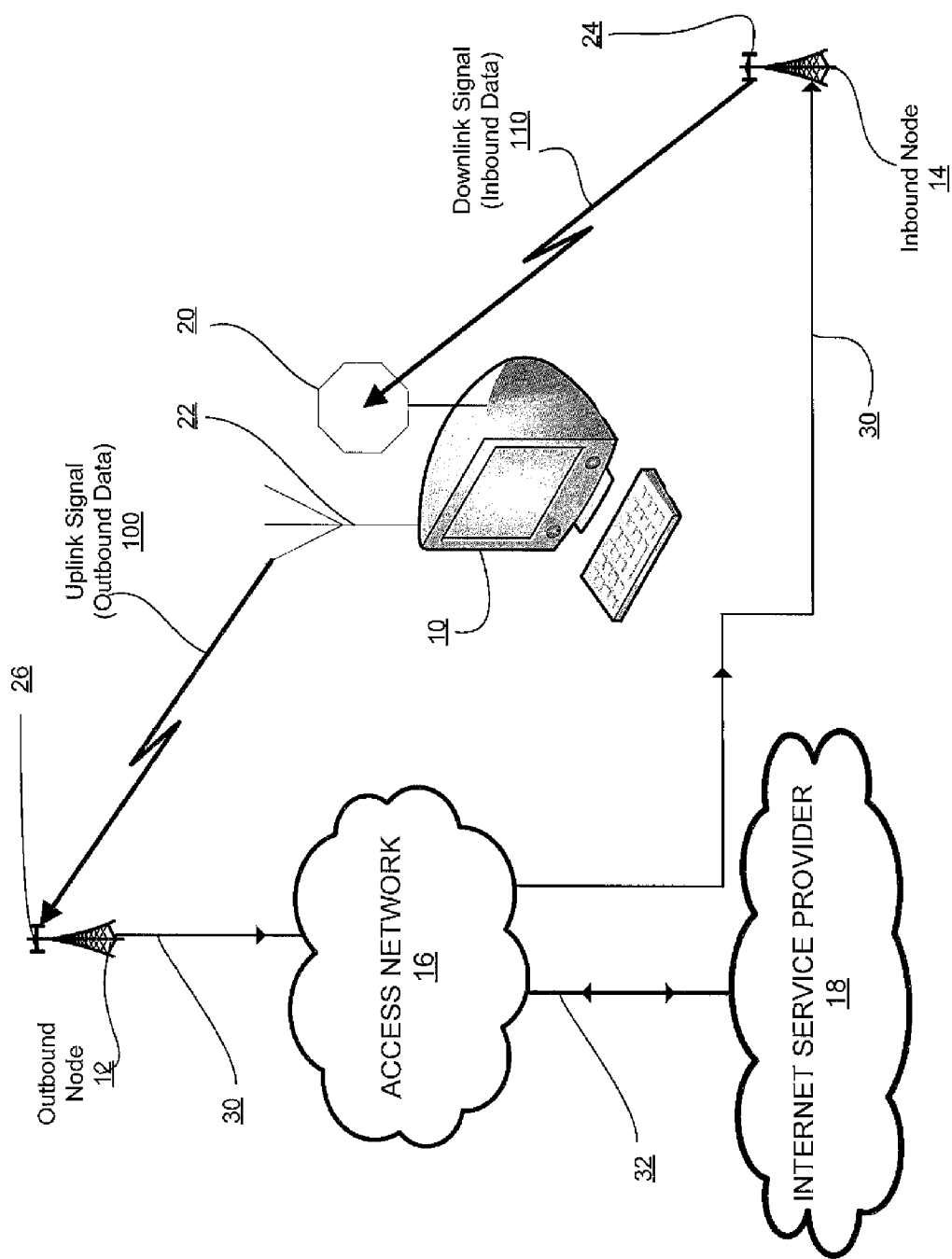
FIG. 2 is a diagram showing an overview of elements of a first preferred embodiment of a terrestrial communications systems in accordance with the present invention.
Figure 3:
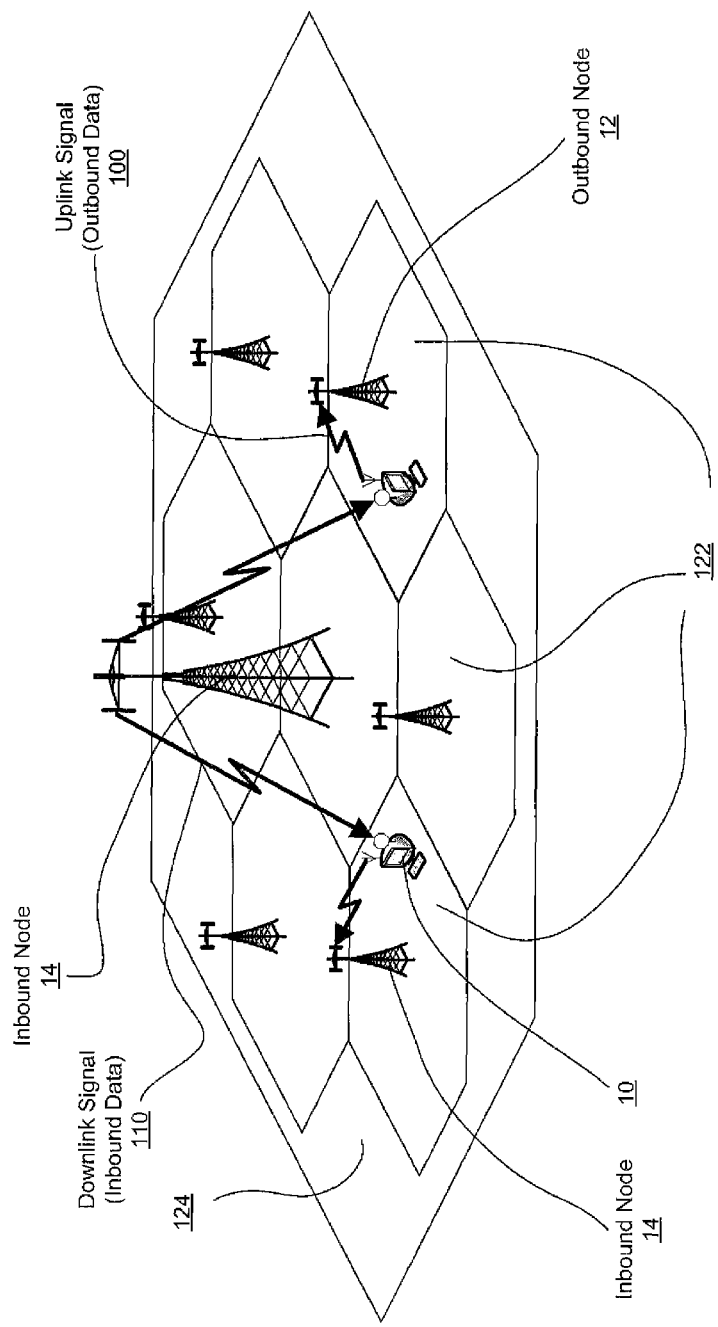
FIG. 3 shows a cellular topology in accordance with the present invention as shown in FIG. 2.

Referring to FIGS. 2-3, the wireless communications system includes a plurality of user units 10, each typically including a personal computer, and an access network 16. The access network includes a plurality of outbound nodes 12 for receiving uplink link signals 100 from the user units 10. The access network further includes a plurality of inbound nodes 14 for transmitting downlink signals 110 to the user units 10. Each of the outbound nodes 12 and inbound nodes 14 are connected to the access network 16 by a backhaul network 30 which may include a wired line link or a microwave link. The access network 16 is connected to an Internet service provider such as Yahoo, MSN, Go ogle, etc. through an Internet backhaul network 32 which may include a fiber optics network, a PSTN system, or similar infrastructure known to those skilled in the art.

Preferably the downlink signals 110 are transmitted in one or any combination of X-band (8-12 GHz), Ku-band (12-18 GHz), K-band (18-27 GHz), and Ka-band (27-40 GHz), while the uplink signals are transmitted in one or any combination of UHF-band (300-1000 MHz), L-band (1-2 GHz) and S-band (2-4 GHz). More preferably, the downlink signals 110 are provided by the inbound node 14 transmitting in the Direct Broadcast Satellite (DBS) band between 12.2 GHz and 12.7 GHz, while the uplink signals 100 are transmitted at between 0.7 GHz and 3.0 GHz to an outbound node 12. The use of a contiguous 500 Mega-Hertz wide DBS band for transmission of downlink signals in a terrestrial wireless cellular network topology presents a great improvement over the prior art. The cellular structure allows the service provider to design the cells with as small or as large cell radiuses that are necessary to match the down link capacity needs of the users. Furthermore, the line of sight nature of this frequency band permits the reuse of the entire band in each cell without significant increase in the inter-cell interference.

The user unit 10 preferably includes a user computer, an uplink transmit antenna 22, and a downlink receive antenna 20. In one embodiment, the user unit 10 further includes a communication board installed in the user computer to facilitate communication with the outbound node 12 and inbound node 14. In another embodiment, the user unit 10 utilizes a separate customer-premises equipment (CPE) to establish communication with the access network. Preferably in this embodiment the uplink transmit antenna 22 and the downlink receive antenna 20 are connected to the CPE. As will be understood by those skilled in the art the uplink transmit antenna 22 and the downlink receive antenna 20 may be combined in a single antenna structure for communication with the both the outbound node 12 and the inbound node 14.

In establishing a connection with the access network 16, the user unit 10 through the communication board installed in the user computer or the CPE initiates a handshaking process according to apriority agreed communication protocol, such as for example, OFDMA, CDMA, or TDMA. As a result, a connection request signal gets radiated by the uplink transmit antenna 22. This signal is received by the uplink receive antenna 26 at the outbound node 12, processed by circuitry there and, depending on the protocol, sent to the access network 16, through the backhaul network 30, for further processing. Upon approval, a connection acceptance signal gets radiated by a downlink transmit antenna 24 at the inbound node 14. This signal is received by a downlink receive antenna 20 of the user unit 10 and processed by either the communication board installed in the user computer or the CPE in accordance with selected protocol.

Internet access process works in a similar ways as in connection establishment process described above. In this case, however, an Internet request gets further propagated from access network 16 to a Internet service provider 18 through an Internet backhaul 32. Internet service provider 18 automatically processes the request by means well know in the art and sends the desired information to the access net 16 through the Internet backhaul 32. The access net 16 then processes it and sends it back to the requesting user through the appropriate inbound node.

Generally, receive antennas operating in the DBS band have very high fixed gain and include a Low Noise Block Converter (LNB). This type of antennas are well suitable for satellite signal reception where the relative change of distance between the satellite transmitter and terrestrial receiver does not change significantly across receivers in the satellite footprint. However, under the present teaching, the relative change of distance between the terrestrial transmitter and receivers across a large cell can be quite significant. As a result, high gains that are necessary for receivers at the fringes of the cell can driver the receivers in the immediate vicinity of transmitter into an unstable state. To avoid this pitfall, downlink receive antenna 20 should have a variable gain LNB to accommodate the variation in path loss across the cell. U.S. Pat. No. 7,286,795 to Ducasse discloses a variable gain LNB that is well suited for terrestrial operations. This patent is hereby incorporated by reference in its entirety.

FIG. 3 depicts a preferred wireless broadband cellular topology according to the present teaching. As shown in this Figure, the cellular topology includes an inbound cell 124 and a plurality of smaller outbound cells 122 that are located within the inbound cell 124. Preferably, at the center of each inbound cell 124 is an inbound node 14 which provides downlink coverage for user units 10 in that cell, and at the center of each outbound cell 122 is a an inbound node 12 which provides uplink coverage for the user units 10 in that cell. In general, a service provider coverage area may contain a number of inbound cells 124.

Depending on user demand, terrain morphology, and service requirements, a number of other cellular topologies are possible. For example, to in crease the downlink throughput per user, the size of the inbound cell may be reduced to cover less users and consequently increase the downlink throughput per user in that cell. Thus, in one embodiment (not shown in the Figure), the cellular topology includes a large outbound cell and a plurality of smaller inbound cells that are located within the outbound cell. In another embodiment, which is discussed further below, the inbound cell and outbound cell have the same size and the inbound node and outbound are collocated a base station.

Figure 4:
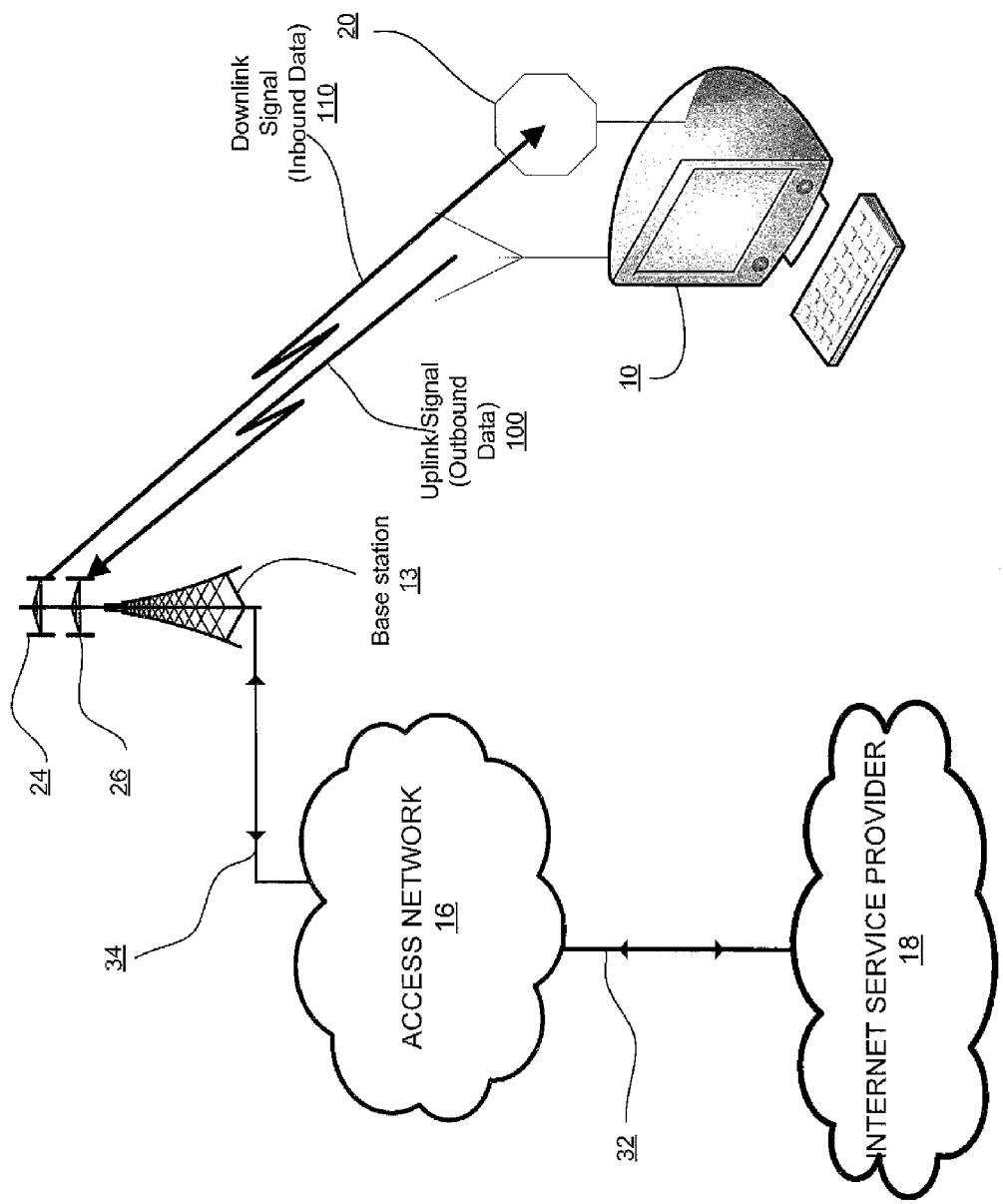
FIG. 4 is a diagram showing an overview of elements of a second preferred embodiment of a terrestrial communications systems in accordance with the present invention.
Figure 5:
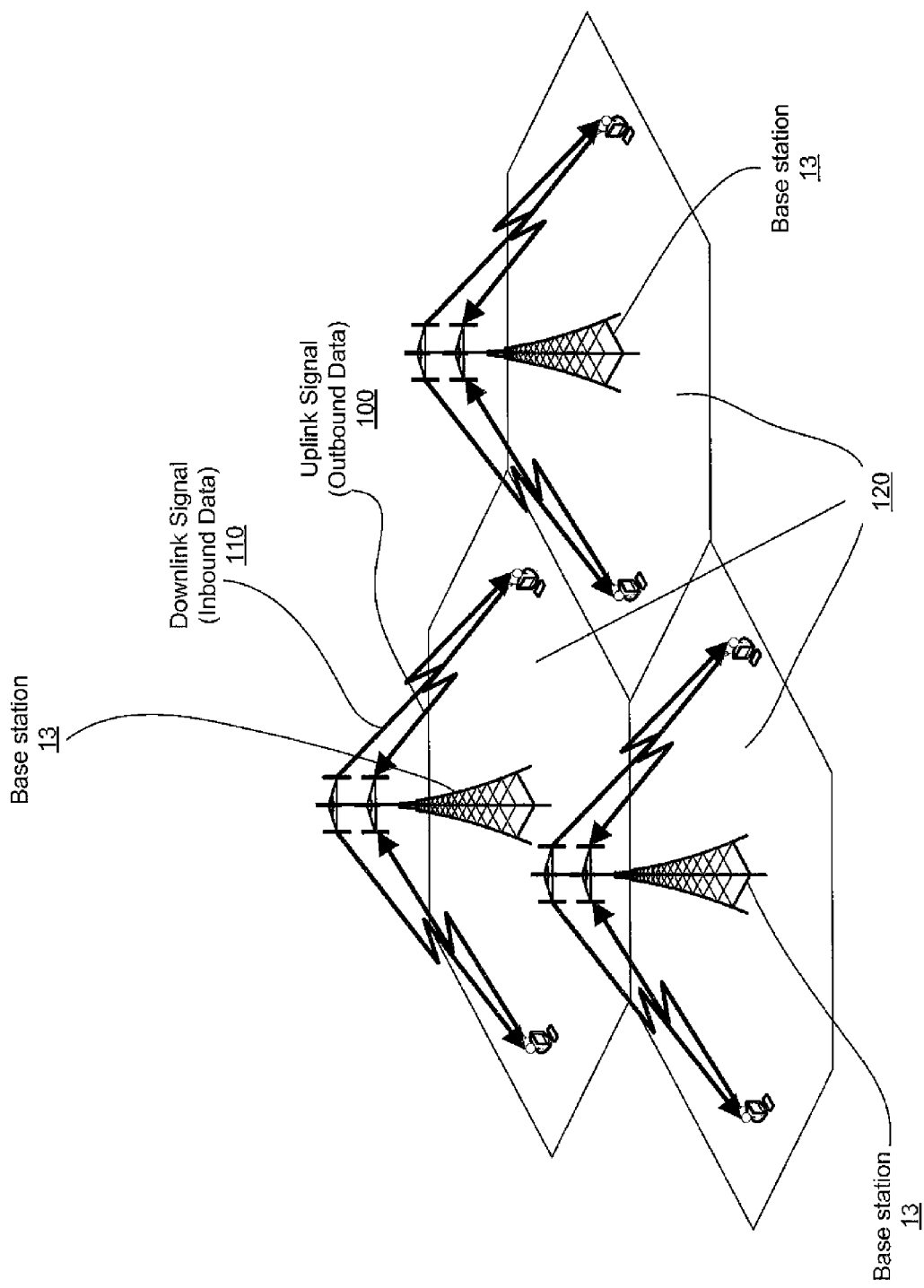
FIG. 5 shows a cellular topology in accordance with the present invention as shown in FIG. 4.

Referring to FIGS. 4-5, in an additional preferred embodiment, the wireless communications system includes a base station 13. The base station 13 integrates the functionality of the inbound node 14 and outbound node 12 into one physical location at each cell site. In this embodiment, the uplink receive antenna 26 and downlink transmit antenna 24 are located at the same cell site and maintain the same functionality as in before. The base stations 13 operates in similar manner to the inbound node 14 and the outbound node 12 shown in FIGS. 2 and 3 in that they transmit the downlink signal 110 and receive the uplink signal 100 to and from the user unit 10 respectively. Internet request received at the base station 13 get propagated to the access network 16 through a backhaul network 34 and then sent to the Internet service provider 18 through the Internet backhaul 32.

Cellular topology associated with this embodiment is shown in FIG. 5. As shown there, base station 13 is placed approximately at the center of each cell 120 so as provide both uplink and downlink coverage for user units 1 in the cell. It is important to note that while the LOS nature of downlink frequency and the use of highly directional receive antennas allows for reuse of the entire allocated spectrum in each cell of the wireless network, the NLOS nature of uplink frequency generally prevents such scenario and requires reuse planning by means well known in the art.

Due to the LOS nature of the downlink frequency, generally an unobstructed line of sight between the downlink transmit antenna 24 and downlink receive antenna 20 is necessary. One way to ensure the existence of such LOS between these two antennas is to place the downlink transmit antenna 24 at very high tower, preferably 30-100 meters or higher. In addition, further visibility may be possible by means of selecting the highest location in the coverage area for placement of the antenna tower. While these techniques are very effective, however, they are not full proof and certain areas of the cell 120 may be excluded or shadowed by manmade obstacles, terrain undulation or antenna pattern. In one embodiment, a small reflector in the coverage area may be used to reflect a portion of the RF beam at a very small elevation angle back to the exclusion area. In another embodiment, an active repeater may be used to amplify the RF signal and project it on to the shadowed area. In yet another embodiment, a regenerative repeater may be used to reconstruct and amplify the down link signal 110 before transmitting it in the shadowed area within the cell 120.

As noted above, in one preferred embodiment the downlink signal 110 is transmitted in the DBS band. Such a reuse of this band for point to multipoint terrestrial transmission can potentially cause interference to DBS customers. To avoid such interference, the downlink transmit antenna 24 should be designed to project a nearly constant field in the coverage cell. The downlink transmit antenna 24 preferably supports transmission of both vertical and horizontal polarization simultaneously, has a vertical beamwidth of about 5 degrees or less, and its', sidelobe envelope towards ground is at least about 15 dB below than the maximum gain. The horizontal antenna pattern of this antenna may be sectorized, preferably to about 60 degrees and has a maximum gain of about 18 dBi.

The present teaching provides for wireless broadband system which facilitates access to Internet for users. Moreover, the present teaching is particularly suited to provide high speed, low propagation delay coverage inexpensively to urban, suburban, and rural areas.

While the invention has been particularly shown and described with reference to specific preferred embodiments, it should be understood by those skilled in the art that various changes in form and detail may be made therein without departing from the spirit and scope of the invention as defined by the appended claims

What is claimed is:

1. A terrestrial communications system comprising:
one or more terrestrial transmitting nodes for transmitting a first set of signals to a plurality of user units;
one or more terrestrial receiving nodes for receiving a second set of signals from a plurality of user units; and
a plurality of user units, each of the user units including a transceiver for transmitting the second set of signals from the user unit to the terrestrial receiving nodes and for concurrently receiving at the user unit the first set of signals from the respective terrestrial transmitting node;
wherein the first set of signals are in a first frequency band between 11.0 GHz-13.0 GHz and wherein said second set of signals are in a second frequency band between 0.7 GHz-3.0 GHz.

2. The terrestrial communication system of claim 1 wherein the first frequency band is a satellite shared band.

3. The terrestrial communication system of claim 2, wherein the satellite shared band is the DBS band.

4. The terrestrial communication system of claim 1, further comprising a terrestrial communications means for transmitting the first set of signals to the terrestrial transmitting nodes and for receiving the second set of signals from the terrestrial receiving nodes.

5. The terrestrial communication system of claim 4, wherein the user units include personal computers.

6. The terrestrial communication system of claim 5, wherein the terrestrial communication means is connected to the Internet for providing the personal computers access to the Internet through the terrestrial communications means, the terrestrial transmitting nodes, and terrestrial receiving nodes.

7. A user unit that provides Internet access, comprising:
a wireless receiver that is configured to receive inbound data from an Internet service provider from a first terrestrial link; and
a wireless transmitter that is configured to wirelessly transmit outbound data to the Internet service provider from a second terrestrial wireless link;
wherein the frequency band of the first terrestrial link is in a first frequency band between 11.0 GHz-13.0 GHz and wherein the frequency band of the second terrestrial link is in a second frequency band between 0.7 GHz-3.0 GHz.

8. The user unit of claim 7, wherein the first frequency band is the DBS band.

9. The user unit of claim 7 wherein the first and second terrestrial links run a Wi-Max protocol.

10. The user unit of claim 7, wherein the second terrestrial link is a Time Division Multiple Access link, a Code Division Multiple Access (CDMA) link, Space Division Multiple Access link or Orthogonal Frequency Division Multiple Access (OFDMA) link.

11. The user unit of claim 7, wherein the first terrestrial link is a Time Division Multiple Access link, a Code Division Multiple Access (COMA) link, Space Division Multiple Access link or Orthogonal Frequency Division Multiple Access (OFDMA) link.

12. A terrestrial communications system comprising:
one or more terrestrial base stations for transmitting a first set of signals to a plurality of user units and receiving a second set of signals from the plurality of user units; and,
each of the user units including a transceiver for transmitting the second set of signals to the base station and for concurrently receiving the first set of signals from the base station;
wherein the first set of signals are in a first frequency band between 11.0 GHz-13.0 GHz and wherein said second set of signals are in a second frequency band between 0.7 GHz-3.0 GHz.

13. The terrestrial communication system of claim 12, further comprising a terrestrial communications means for transmitting the first set of signals to the base station and for receiving the second set of signals from the terrestrial base stations.

14. The terrestrial communication system of claim 12, wherein the user units include personal computers.

15. The terrestrial communication system of claim 13, wherein the terrestrial communication means is connected to the Internet for providing the personal computers access to the Internet through the terrestrial communications means, and terrestrial base stations.

16. The terrestrial communication system of claim 12, wherein the first frequency band is the DBS band.

17. The terrestrial communication system of claim 16, wherein the terrestrial base station further comprises a transmit antenna for radiating the first set of signals.

18. The terrestrial communication system of claim 17, wherein the transmit antenna has a maximum gain and a vertical beam pattern that are designed to minimize the interference to DBS receivers.

19. The terrestrial communication system of claim 18, wherein the vertical beam pattern of the transmit antenna includes a beamwidth that is about 5 degrees or less and a sidelobe envelope towards ground that is about 15 dB or more below the maximum gain.

20. The terrestrial communication system of claim 17, wherein the transmit antenna is sectorized.

* * * * *